US009428247B2

(12) United States Patent
Kosaka et al.

(10) Patent No.: US 9,428,247 B2
(45) Date of Patent: Aug. 30, 2016

(54) CONTROL DEVICE

(71) Applicant: Shimano Inc., Sakai, Osaka (JP)

(72) Inventors: Kentaro Kosaka, Osaka (JP);
Yoshimitsu Miki, Osaka (JP); Akinori Hashimoto, Osaka (JP); Ayumi Kato, Osaka (JP); Kazuya Takahashi, Osaka (JP); Koji Yuasa, Osaka (JP)

(73) Assignee: Shimano Inc., Osaka (JP)

( * ) Notice: Subject to any disclaimer, the term of this patent is extended or adjusted under 35 U.S.C. 154(b) by 359 days.

(21) Appl. No.: 14/283,334

(22) Filed: May 21, 2014

(65) Prior Publication Data

US 2014/0354038 A1     Dec. 4, 2014

(30) Foreign Application Priority Data

May 30, 2013   (JP) ................... 2013-113832

(51) Int. Cl.
*B62M 25/08* (2006.01)
*B60W 10/00* (2006.01)

(52) U.S. Cl.
CPC ................... *B62M 25/08* (2013.01)

(58) Field of Classification Search
CPC ..................................................... B60W 10/00
USPC ........................................................... 307/9.1
See application file for complete search history.

(56) References Cited

FOREIGN PATENT DOCUMENTS

| CN | 101372251 A | 2/2009 |
|----|-------------|--------|
| JP | 2008-168751 A | 7/2008 |

*Primary Examiner* — Robert Deberadinis
(74) *Attorney, Agent, or Firm* — Global IP Counselors (57) ABSTRACT

A control device is provided for controlling an electric device on a bicycle. The control device basically includes a bicycle attachment member, an operating member, an operation detection unit and a signal output unit. The operating member includes at least a first operating part and a second operating part. The operating member is rotatably mounted to the attachment member to rotate in a prescribed operation direction. The operation detection unit is arranged to detect selective operation of the first and second operating parts in the operation direction. The signal output unit outputs an actuation signal to actuate the electric device based on a detection result from the operation detection unit.

17 Claims, 5 Drawing Sheets

CONTROL DEVICE

CROSS-REFERENCE TO RELATED APPLICATIONS

This application claims priority to Japanese Patent Application No. 2013-113832, filed on May 30, 2013. The entire disclosure of Japanese Patent Application No. 2013-113832 is hereby incorporated herein by reference.

BACKGROUND

1. Field of the Invention

This invention generally relates to a control device. More specifically, the present invention relates to a bicycle control device for controlling the electric devices on a bicycle.

2. Background Information

A control device controls an electric device that is mounted on a bicycle such as an electric gear shift device. The control device is provided with two operating members on the handlebar for example, in the form of levers for gear shifting, and outputs different actuation signals in accordance with the operation of the two operating members (refer to, for example, Japanese Laid-Open Patent Publication No. 2008-168751). In the conventional control device, the two operating members move independently.

SUMMARY

A conventional control device tends to have a complicated configuration when provided with two independently movable operating members.

One aspect presented in the present disclosure is to provide a control device with a simplified configuration for controlling an electric device.

A control device according to the present invention is provided for controlling an electric device on a bicycle. The control device includes an attachment member, an operating member, an operation detection unit and a signal output unit. The operating member includes at least a first operating part and a second operating part. The operating member is rotatably mounted to the attachment member to rotate in a prescribed operation direction. The operation detection unit is arranged to detect selective operation of the first and second operating parts in the operation direction. The signal output unit outputs an actuation signal to actuate the electric device based on a detection result from the operation detection unit.

In the control device, the operation detection unit determines which of the first operating part or the second operating part is operated in the operation direction, and the signal output unit outputs an operation signal for operating the electric device on the basis of the detection result. Hereby, a plurality of actuation signals may be output without providing the two operating members on the attachment member to be separately movable. More specifically, it is possible to simplify the control device used for controlling the electric device.

The operating member further includes a base part rotatably disposed on the attachment member to rotate about a rotation axis. In this case, the operating member may be rotatably operated, thereby simplifying the configuration for the operating member.

The first and second operating parts extend radially from the base part as separate and distinct individual elements. The operation detection unit has a first detection unit arranged to detect the operation of the first operating part, and a second detection unit arranged to detect the operation of the second detection part. In this case the first operating part and the second operating part separately extend radially from the base part to thereby facilitate differentiating between the first operating part and the second operating part.

The control device can also be provided with a movement detection unit arranged to detect movement of the operating member towards the operation direction. The signal output unit outputs the actuation signal based on a detection result from the movement detection unit in addition to the detection result from the operation detection unit. In this case it is possible to detect the movement of the operating member toward the operation direction as well as which of the first operating part or the second operating part is operated, which therefore allows a larger variety of actuation signals to be output in accordance with the combination of the two detection results.

The first operating part extends radially from the base part to a free end that is a first distance from the rotation axis. The first and second distances are preferably different from each other. In this case the first operating part and the second operating part are different distances from the base part, and therefore facilitates differentiating between the first operating part and the second operating part.

The first and second operating parts are disposed on the base part at different angular positions with respect to the rotation axis. In this case this arrangement facilitates in differentiating between the first operating part and the second operating part.

The first detection unit includes a first pressure sensor that is disposed on the first operating part. The second detection unit includes a second pressure sensor that is disposed on the second operating part. In this case the pressure sensor may be used to detect the operation of the first operating part or the operation of the second operating part, for example, through the contact or non-contact of electrodes. Thus it is possible to increase the operating life of the control device.

The first detection unit includes a first capacitance sensor that is disposed on the first operating part. The second detection unit includes a second capacitance sensor that is disposed on the second operating part. In this case the capacitance sensor can be used to detect operation of the first operating part or the second operating part, for example through the contact or non-contact of the electrodes. Thus it is possible to increase the operating life of the control device.

The first detection unit includes a first push switch that is disposed on the first operating part. The second detection unit includes a second push switch that is disposed on the second operating part. In this case, the control device can be constructed inexpensively.

The control device can be further provided with a biasing member biasing the operating member toward an initial position in a direction opposite to the operation direction. In this case, even when the rider operates the first operating part or the second operating part from the initial position to the operation position, the operating member returns to the initial position and the rider can control the electric device with the same movement.

It is possible to simplify the control device used for controlling the electric device. Also other objects, features, aspects and advantages of the disclosed control device will become apparent to those skilled in the art from the following detailed description, which, taken in conjunction with the annexed drawings, discloses illustrative embodiments of the control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
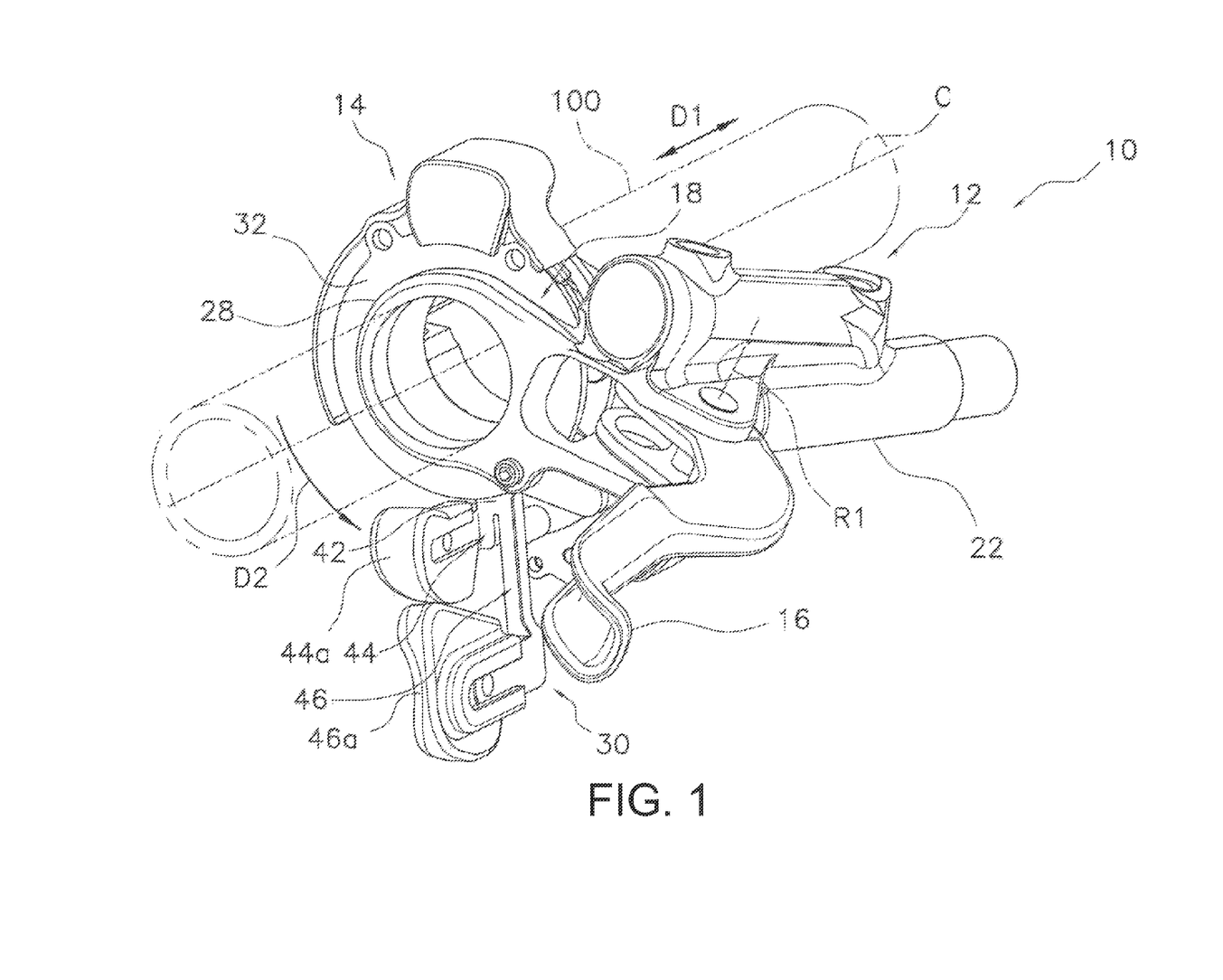
FIG. 1 is a perspective view of a control device in accordance with a first embodiment.
Figure 2:
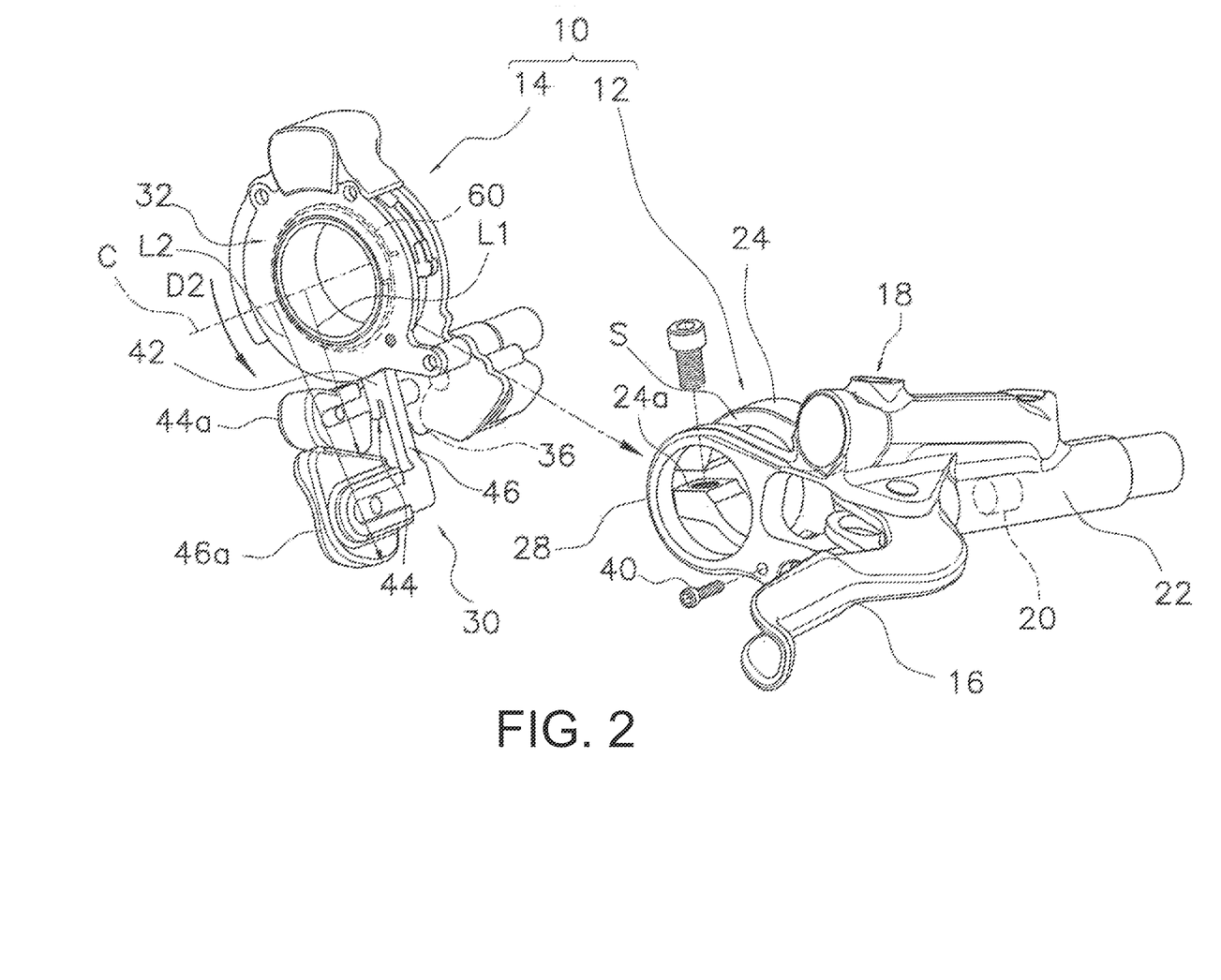
FIG. 2 is an exploded perspective view of the control device illustrated in FIG. 1.
Figure 3:
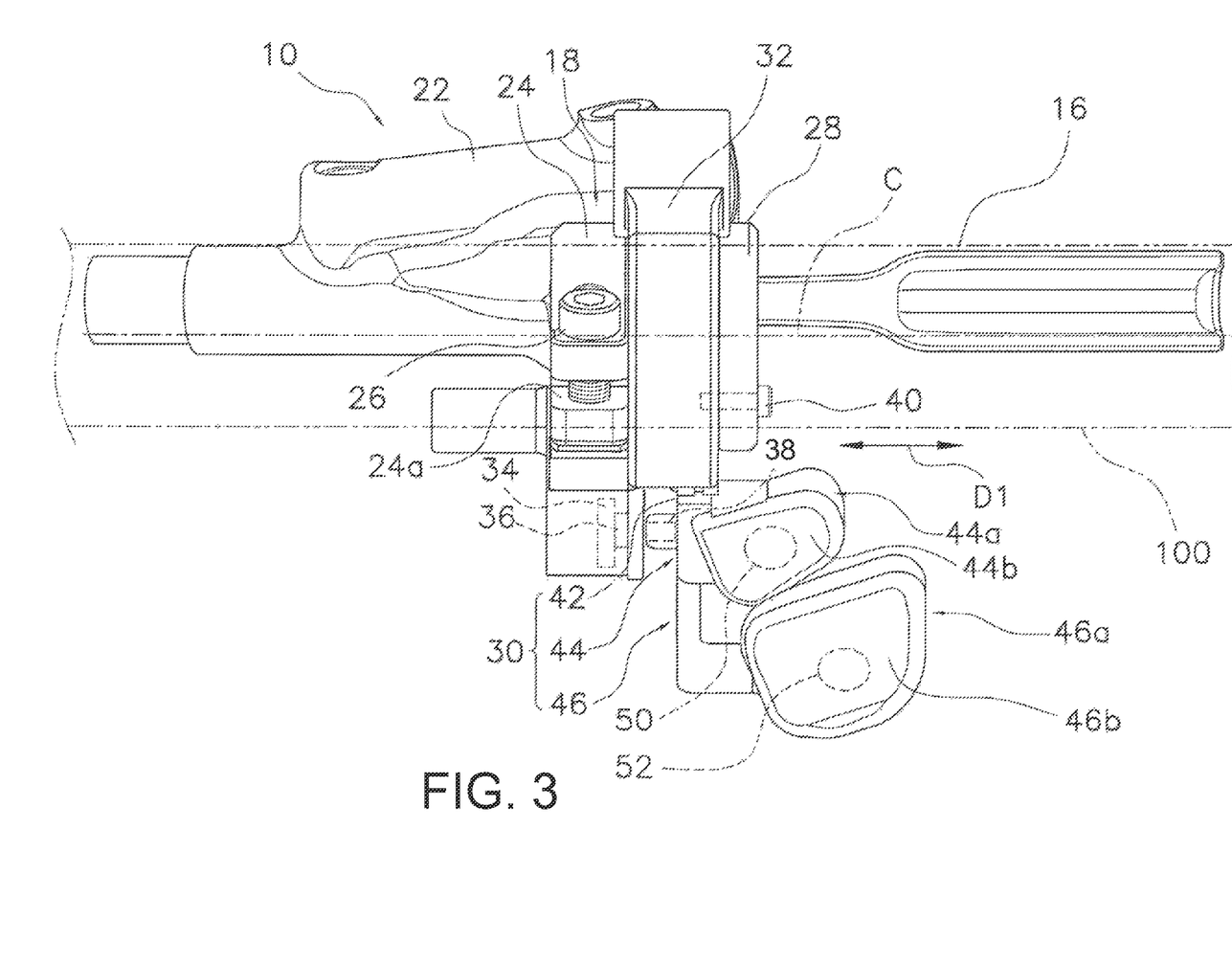
FIG. 3 is a rear elevational view of the control device illustrated in FIGS. 1 and 2.

As shown in FIGS. 1 to 3, a control device 10 is illustrated according to the first embodiment that is attached to the handlebar 100 on the bicycle. The control device 10 is provided with a first control unit 12 for controlling a brake device and a second control unit 14 for controlling an electric gear shift device 80 (refer to FIG. 4). The electric gear shift device is one example of an electric device on the bicycle. The electric gear shift device 80 can include, for example, an electric front derailleur, an electric rear derailleur, and an electric internal hub. The electric devices on the bicycle can further include an electric suspension and an electric seat post.

The first control unit 12 includes a lever (brake lever) 16, and an attachment member 18 being attachable to the handlebar 100 of the bicycle.

The attachment member 18 includes a piston 20, a master cylinder 22 for movably housing the piston, and a clamp 24. The clamp 24 clamps onto the handlebar 100 by using a bolt 26 to reduce the gap in a slit 24a. Hereby, the attachment member 18 can be secured to the handlebar 100. In addition, the attachment member 18 includes an opposing part 28 that is opposite the clamp 24 in the axial direction D1 of the handlebar 100 to form a space S (refer to FIG. 2) with the clamp 24. The opposing part 28 can be provided as ring for inserting the handlebar 100.

The lever 16 is attached to the attachment member 18 for pivoting about a rotation axis R1. The lever 16 is connected to the piston 20 situated inside the master cylinder 22 via a piston rod (not shown). As the lever 16 pivots, the piston 20 moves within the master cylinder 22 and pushes a liquid, such as oil outside the master cylinder 22. Hereby, a hydraulic disc brake device (not shown) attached to the bicycle is actuated.

This kind of control system is widely known and therefore a detailed description will be omitted.

Figure 4:
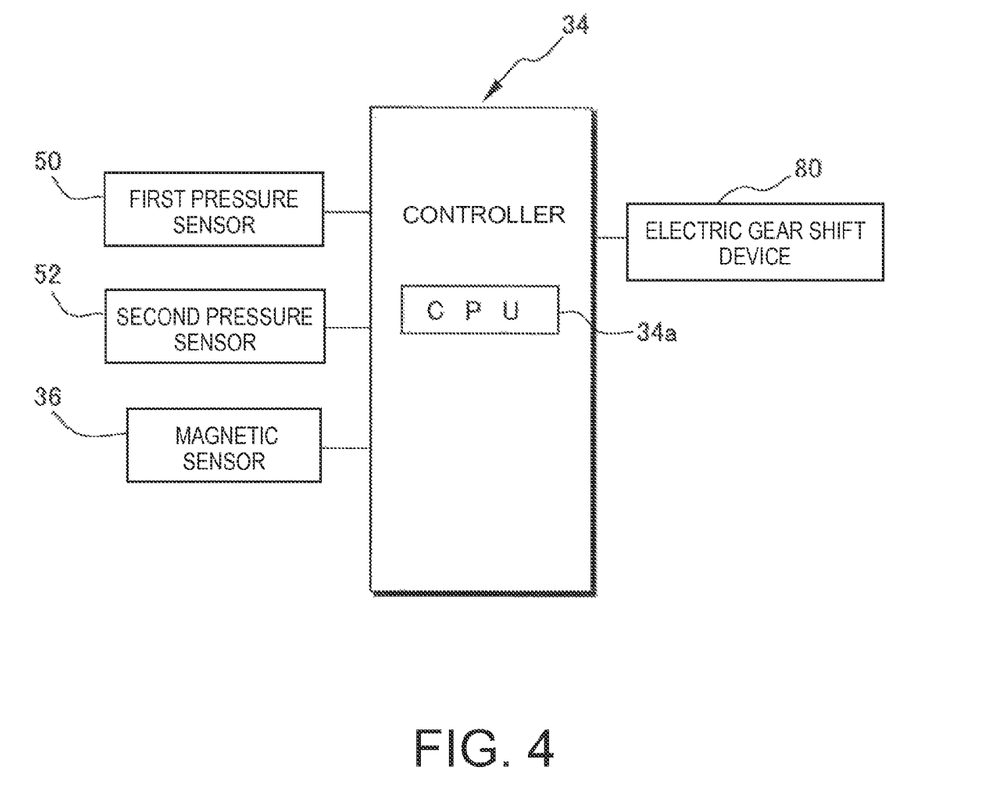
FIG. 4 is a block diagram of an overall configuration of the control system of the control device illustrated in FIGS. 1 to 3.

The second control unit 14 includes an operating member 30, an annular main body 32 and a controller 34 (refer to FIGS. 3 and 4). The annular main body 32 is dimensioned for receiving the handlebar 100. The main body 32 is disposed concentrically with the clamp 24 and the opposing part 28 in the space S between the clamp 24 and the opposing part 28. The main body 32 is set to be slightly smaller than the space S along the axial direction D1. Hereby, the main body 32 is in contact with each opposing surface on the clamp 24 and the opposing part 28 while the main body 32 is arranged in the space S. The main body 32 may be fixed to the opposing part 28 using a screw member 40. That is, in the present embodiment, the second control unit 14 is mounted to the handlebar 100 indirectly by way of the first control unit 12 which is the brake control device. Moreover, the main body 32 may have the same configuration as the clamp 24, if the control device 10 of the present invention is configured to be independent of the brake control device. In this case, the main body 32 constitutes a bicycle attachment member of the control device 10.

As shown in FIG. 3, the main body 32 is provided with the controller 34. As shown in FIG. 4, the controller 34 includes a CPU 34a as well as volatile and/or non-volatile memory (not shown); further, as later described, the controller 34 outputs various signals on the basis of the detection results from the various sensors. Additionally, as shown in FIGS. 2, 3 and FIG. 4, the main body 32 is provided with a magnetic sensor 36 for detecting the movement of the operating member 30 toward the operation direction D2. The magnetic sensor 36 includes a Hall Effect element or the like, and detects the magnetic force of a magnet 38 that is provided for the operating member 30. Furthermore, the magnet 38 is provided to face the magnetic sensor 36 when the operating member 30 rotates from the initial position in the operation direction D2.

The operating member 30 may be provided for rotating in a prescribed operation direction with respect to the main body 32. In the present embodiment, the operating member 30 is provided on the main body 32 for rotating about the central axis C (the axis through the handlebar 100) of the main body 32. The central axis C is one example of the rotation axis. The operating member 30 is configured so that pressing the operating member 30 in the operation direction D2 from the prescribed initial position rotates the operating member 30 from an initial position towards an operation position which is set at a prescribed angle (a range of, for example, 5 degrees to 30 degrees) away from the initial position. A biasing member 60 (refer to FIG. 2) biases the operating member 30 toward its initial position in a direction opposite the operation direction D2, such that the operating member 30 returns to the initial position after being operated to an operated position. That is to say, the operating member 30 is configured as a trigger lever. The biasing member 60 can be, for example, a helical torsion spring with one end engaged with the operating member 30, and the other end engaged with the main body 32. The biasing member 60 can be other types of springs as needed and/or desired. The magnetic sensor 36 detects the magnetic force of the magnet 38 and inputs a prescribed signal to the controller 34 as the operating member 30 rotates in the operation direction D2. Hereby allowing the movement of the operating member 30 to be detected. In other words, in the present embodiment, the movement detection unit is formed by the controller 34 and the magnetic sensor 36.

The operating member 30 has a base part 42 provided on the main body 32 for rotating about the central axis C. The operating member 30 also has a first operating part 44 and a second operating part 46. The first and second operating parts 44 and 46 extend radially from the base part 42 as separate and distinct individual elements. The first operating part 44 extends radially from the base part 42 to a free end that is a first distance L1 from the central axis C (refer to FIG. 2). The second operating part 46 extends radially from the base part 42 to a free end that is a second distance L2 from the central (rotation) axis C. The first distance L1 and the second distance L2 are different from each other. In the present embodiment, the first operating part 44 and the second operating part 46 are configured so that the second distance L2 is longer than the first distance L1. The first operating part 44 and the second operating part 46 are disposed on the base part 42 at different positions about the central axis C. In the present embodiment the second operating part 46 is disposed further downstream of the first operating part 44 in the operation direction D2. One of the first operating part 44 and the second operating part 46 may be provided for actuating the upshift movement of the electric gear shift device 80, for example. The other of the first operating part 44 and the second operating part 46 can be provided for actuating the downshift movement of the electric gear shift device 80, for example.

The first operating part 44 has a first pressing part 44a at the tip end part (the end opposite the base part 42). The second operating part 46 has a second pressing part 46a at the tip end part. As shown in FIG. 3, first pressing part 44a has a first pressing surface 44b. And the second pressing part 46a has a second pressing surface 46b. The first pressing surface 44b and the second pressing surface 46b may have different curved shapes for differentiation by the tactile sense. In the present invention, the first pressing surface 44b and the second pressing surface 46b can be formed to recess at slightly different depths, for example. Additionally, the first pressing surface 44b may have a smaller surface area than the second pressing surface 46b.

As shown in FIG. 3, the first pressing part 44a is provided with a first pressure sensor 50 for detecting the operation of the first operating part 44. The second pressing part 46b is provided with a second pressure sensor 52 for detecting the operation of the second operating part 46. The first pressure sensor 50 is embedded in the first pressing surface 44b of the first operating part 44 and inputs a prescribed signal to the controller 34 in accordance with the pressure on the first pressing surface 44b. The second pressure sensor 52 is embedded in the second pressing surface 46b of the second operating part 46 and inputs a prescribed signal to the controller 34 in accordance with the pressure on the second pressing surface 46b. In the present embodiment, an operation detection unit is formed by the controller 34, the first pressure sensor 50, and the second pressure sensor 52 for detecting which of either the first operating part 44 or the second operating part 46 of the operating member 30 is operated in the operation direction D2. That is, a first detection unit is formed by the controller 34 and the first pressure sensor 50 for detecting operation of the first operating part 44. Additionally, a second detection unit is formed by the controller 34 and the second pressure sensor 52 for detecting operation of the second operating part 46.

The controller 34 also acts as a signal output unit. This signal output unit of the controller 34 executes a prescribed software program. The controller 34 outputs a first actuation signal and a second actuation signal to the electric gear shift device 80 in accordance with the input from the magnetic sensor 36, the first pressure sensor 50, and the second pressure sensor 52. More specifically, the controller 34 outputs the first actuation signal to the electric gear shift device 80 in accordance with the input from the first pressure sensor 50, and the input from the magnetic sensor 36. Further, the controller 34 outputs the second actuation signal to the electric gear shift device 80 in accordance with the input from the second pressure sensor 52, and the input from the magnetic sensor 36. One of the first actuation signal and the second actuation signal may be provided to the electric gear shift device 80 as, for example, an upshift signal. The other of the first actuation signal and the second actuation signal can be provided to the electric gear shift device 80 as, for example, a downshift signal.

In the control device 10 configured in this manner, the first operating part 44 and the second operating part 46 can be provided on a single operating member 30 for moving in the operation direction D2. When either one of the first operating part 44 or the second operating part 46 is operated, the controller 34 can detect which of the first operating part 44 or the second operating part 46 is operated in the operation direction D2 via one of the first pressure sensor 50 and the second pressure sensor 52. Further, the controller 34 can detect via the magnetic sensor 36 whether or not the operating member 30 is rotated to the operation position. The controller 34 can output to the electric gear shift device 80 the actuation signals (the first actuation signal and the second actuation signal) for actuating the electric devices such as the electric gear shift device 80, on the basis of the detection results. Hereby, a plurality of actuation signals may be output without providing the two operating members on the attachment member to be separately movable. More specifically, it is possible to simplify the control device 10 used for controlling the electric device.

Combining the first control unit 12 and the second control unit 14 thereby eliminates the need for the first control unit 12 and the second control unit 14 to be setup separately from the attachment member for attachment to the handlebar 100. Thus, in this case, it is possible to simplify the configuration on the handlebar 100. Moreover, the second control unit 14 is provided with the operating member 30 for rotating about the central axis C of the handlebar 100. In this way, the device may be made more compact when compared to providing the rotation axis for the lever and the like as a separate axis. The configuration on the handlebar 100 can also be simplified from this aspect.

Second Embodiment

Figure 5:
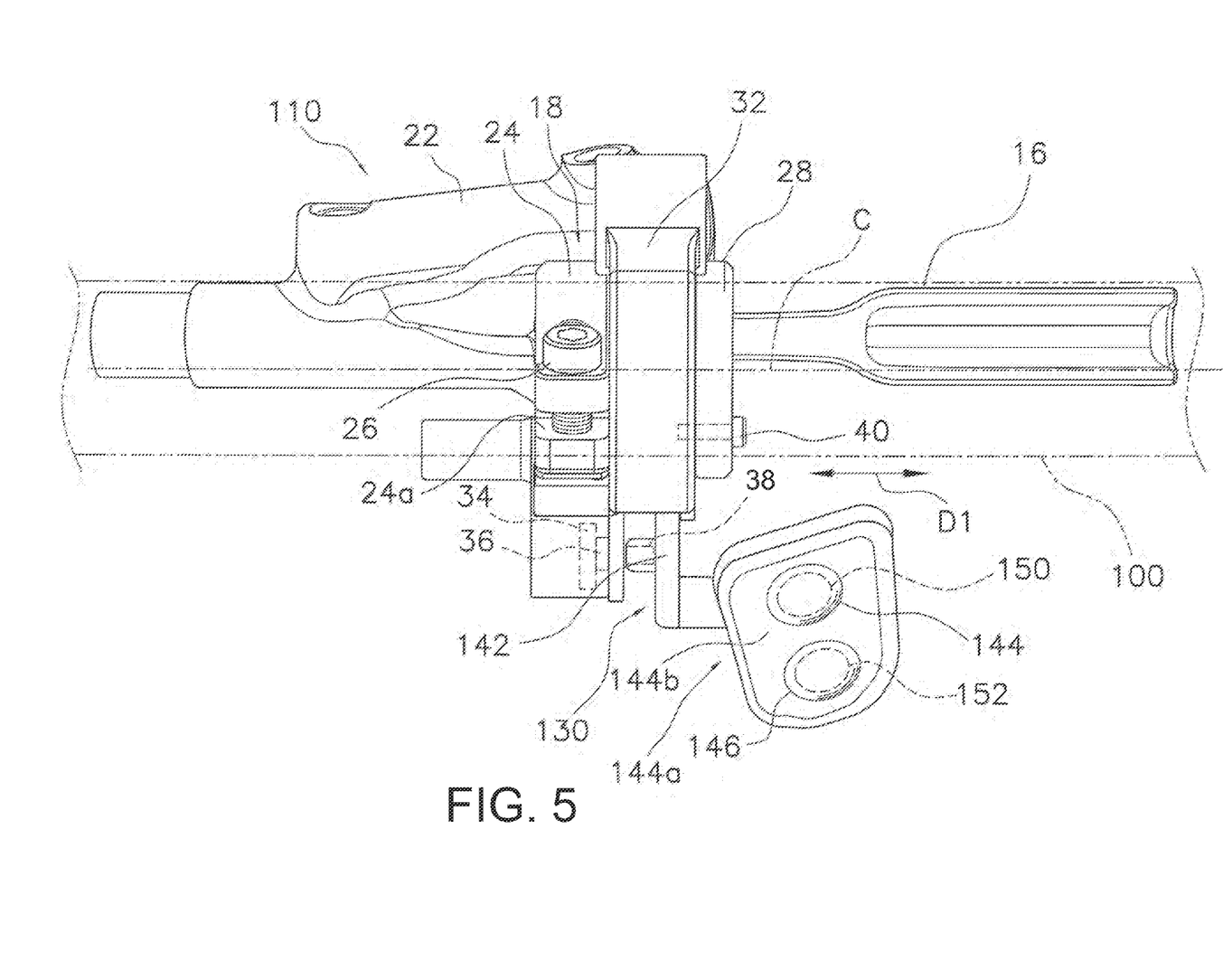
FIG. 5 is a rear elevational view, similar to FIG. 3, of a control device in accordance with a second embodiment.

Now, as seen in FIG. 5, a control device 110 is illustrated in accordance with a second embodiment. In the above described first embodiment, the first pressing part 44a and the second pressing part 46a are provided corresponding to the first operating part 44 and the second operating part 46. However, another possible configuration is that of the control device 110 of the second embodiment shown in FIG. 5. In the control device 110, the operating member 130 has a single pressing part 144a. The pressing surface 144b of the pressing part 144a is provided with a first pressure sensor 150 and a second pressure sensor 152. In the second embodiment, the first operating part 144 is an area for detecting pressure using the first pressure sensor 150, and the second operating part 146 is an area for detecting pressure using the second pressure sensor 152. The first operating part 144 and the second operating part 146 are formed protruding further than the other areas on the pressing surface 144b to allow differentiating the first operating part 144 and the second operating part 146. Given that the remaining configuration is similar to that of the first embodiment, the description thereof will be omitted.

While only selected embodiments have been chosen to illustrate the present invention, it will be apparent to those skilled in the art from this disclosure that various changes and modifications can be made herein without departing from the scope of the invention as defined in the appended claims. Thus, the present invention is not limited to the above described embodiment and can be modified in various ways insofar as the modifications remain within the spirit and scope of the invention. More specifically, the embodiments and modification examples disclosed in this specification can be arbitrarily combined as necessary.

In the above mentioned two embodiments, the control device is provided on the handlebar of the bicycle. However, the present invention is not limited to this configuration. The present invention can also be applied to a control device that can be attached to a part other than the handlebar of the bicycle, such as the bicycle frame and the like.

In the above mentioned two embodiments, the electric gear shift device is provided as an example of the electric device. However, the present invention is not limited to this configuration. The electric devices to which the present invention can be applied also include an electric suspension, an electric seat post, and an electric driving device that drives the bicycle.

In the above mentioned two embodiments, the control device is integrated with the first control unit which is the brake operating device for the bicycle. However, the present invention is not limited to this configuration. The control device can be an independent device implemented for actuating an electric device.

In the above mentioned two embodiments, the actuation signal is output on the basis of the detection results of the operation detection unit and the movement detection unit. However, the present invention is not limited to this configuration. The actuation signal can be output on the basis of the detection results from only the operation detection unit.

In the above mentioned two embodiments, a first detection unit includes a first pressure sensor, and a second detection unit includes a second pressure sensor. However, the present invention is not limited to this configuration. For example, the first detection unit can contain a first capacitance sensor and the second detection unit can contain a second capacitance sensor. Furthermore, the first detection unit can contain a first push switch and the second detection unit can contain a second push switch. In other words, the operation detection unit can employ the appropriate sensor and/or the appropriate switch.

In the above mentioned two embodiments, in this case the movement detection unit contains a magnetic sensor that detects the magnet provided for the operating member. However, the present invention is not limited to this configuration. The movement detection unit can employ a sensor and/or a switch suitable for detecting the movement of the operating member. For example, the movement detection unit can employ a rotation detector such as a rotary encoder, or a potentiometer.

In the above mentioned two embodiments, the operation detection units containing pressure switches are provided to each of the first and second operating parts. However, the operation detection unit can be provided to one of the first operating part or the second operating part. In this case, the actuation signal can be output in accordance with the detection result from the movement detection unit and the detection result from the operation detection unit. Specifically, when the operation detection unit is provided to the first operating part, the signal output unit can output the first actuation signal when the operation detection part detects the operation of the first operating part, and the movement detection unit detects the movement of the operating member. Additionally, the signal output unit outputs the second actuation signal when the movement detection unit detects the movement of the operating member and the operation detection unit has not detected the operation of the first operating part.

Thus, the foregoing descriptions of the embodiments according to the present invention are provided for illustration only, and not for the purpose of limiting the invention as defined by the appended claims and their equivalents.

What is claimed is:

1. A control device for controlling an electric device on a bicycle, the control device comprising:
   a bicycle attachment member;
   an operating member including at least a first operating part and a second operating part, the operating member being rotatably coupled to the attachment member to rotate in a prescribed operation direction;
   an operation detection unit arranged to detect selective operation of the first and second operating parts in the operation direction; and
   a signal output unit that outputs an actuation signal to actuate the electric device based on a detection result from the operation detection unit.

2. The control device according to claim 1, wherein
   the operating member further includes a base part rotatably disposed on the attachment member to rotate about a rotation axis.

3. The control device according to claim 2, wherein
   the first and second operating parts extend radially from the base part as separate and distinct individual elements; and
   the operation detection unit has a first detection unit arranged to detect the operation of the first operating part, and a second detection unit arranged to detect the operation of the second detection part.

4. The control device according to claim 3, further comprising
   a movement detection unit arranged to detect movement of the operating member towards the operation direction; and
   the signal output unit outputs the actuation signal based on a detection result from the movement detection unit in addition to the detection result from the operation detection unit.

5. The control device according to claim 3, wherein
   the first operating part extends radially from the base part to a free end that is a first distance from the rotation axis; and
   the second operating part extends radially from the base part to a free end that is a second distance from the rotation axis, the first and second distances being different from each other.

6. The control device according to claim 3, wherein
   the first and second operating parts are disposed on the base part at different angular positions with respect to the rotation axis.

7. The control device according to claim 3, wherein
   the first detection unit includes a first pressure sensor disposed on the first operating part, and
   the second detection unit includes a second pressure sensor disposed on the second operating part.

8. The control device according to claim 3, wherein
   the first detection unit includes a first capacitance sensor disposed on the first operating part, and
   the second detection unit includes a second capacitance sensor disposed on the second operating part.

9. The control device according to claim 3, wherein
   the first detection unit includes a first push switch disposed on the first operating part, and
   the second detection unit includes a second push switch disposed on the second operating part.

10. The control device according to claim 2, further comprising
a biasing member biasing the operating member toward an initial position in a direction opposite to the operation direction.

11. The control device according to claim 3, further comprising
a biasing member biasing the operating member toward an initial position in a direction opposite to the operation direction.

12. The control device according to claim 4, wherein
the first operating part extends radially from the base part to a free end that is a first distance from the rotation axis; and
the second operating part extends radially from the base part to a free end that is a second distance from the rotation axis, the first and second distances being different from each other.

13. The control device according to claim 4, wherein
the first and second operating parts are disposed on the base part at different angular positions with respect to the rotation axis.

14. The control device according to claim 4, wherein
the first detection unit includes a first pressure sensor disposed on the first operating part, and
the second detection unit includes a second pressure sensor disposed on the second operating part.

15. The control device according to claim 4, wherein
the first detection unit includes a first capacitance sensor disposed on the first operating part, and
the second detection unit includes a second capacitance sensor disposed on the second operating part.

16. The control device according to claim 4, wherein
the first detection unit includes a first push switch disposed on the first operating part, and
the second detection unit includes a second push switch disposed on the second operating part.

17. The control device according to claim 4, further comprising
a biasing member biasing the operating member toward an initial position in a direction opposite to the operation direction.

\* \* \* \* \*